April 27, 1954
J. B. PARSONS
2,676,571
HYDRAULIC LINEAR MOTOR
Filed April 11, 1951
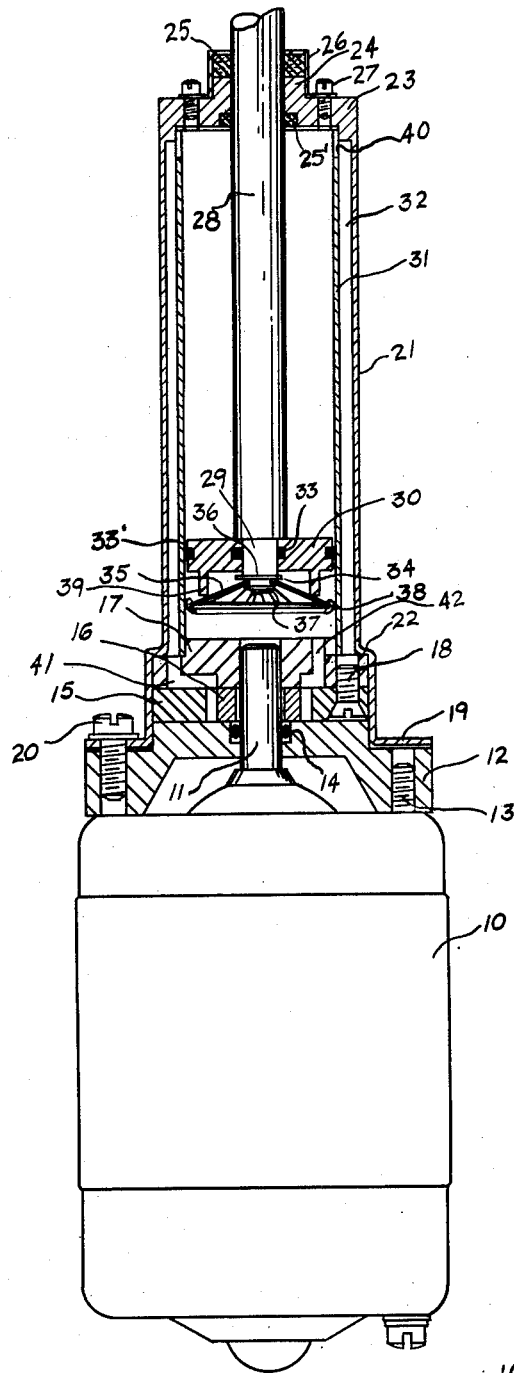
INVENTOR.
JOHN B PARSONS
BY
attorney Patented Apr. 27, 1954

2,676,571

UNITED STATES PATENT OFFICE 2,676,571

HYDRAULIC LINEAR MOTOR

John B. Parsons, Maumee, Ohio

Application April 11, 1951, Serial No. 220,390

2 Claims. (Cl. 121—40)

This invention relates to linear motors, but particularly those which are fluid-operated, and an object is to produce a unitary assembly embodying a linear motor, pump, motor for driving the pump and means for retaining the linear motor in selected position of adjustment.

Another object is to produce a unitary device, the linear motor powered by a hydraulic pump which in turn is driven by a rotary motor, new and improved means being provided for restraining the fluid motor in the selected position of adjustment particularly from inward or retrograde movement.

Other objects reside in details of construction, arrangement and operation hereinafter described, and for purposes of illustration but not of limitation, embodiments of the invention are shown on the accompanying drawing, in which The figure is a longitudinal sectional view of a linear motor and the electric motor for driving the hydraulic pump for same.

The illustrated embodiment of the invention comprises a reversible electric motor 10 having an armature shaft extension 11 which projects through and has bearing in an arched plate member 12 which is secured to the housing of the electric motor 10 by a series of screws 13. A liquid seal 14 is disposed within a socket in the member 12 and embraces the armature extension 11. Fitting against the upper face of the member 12 is a pump housing 15 which may be secured to the member 12 by a series of screws (not shown). Within the housing 15 is a conventional hydraulic gear pump, one rotor 16 of which is shown and which is suitably keyed to the armature extension 11. Resting on the upper face of the pump housing 15 is a ported block 17 secured thereto by a series of screws 18. The diameters of the block 17 and pump housing are the same and substantially less than the diameter of the lower portion of the member 12.

Resting against the lower portion of the member 12 is a cylinder flange 19 which is secured to the member 12 by a series of screws 20. Integral with the flange 19 is a longitudinally elongate cylinder 21 which is flanged inwardly at 22 to overly a portion of the ported block 17. On the upper end of the cylinder 21 is a head 23 which has an axial extension 24 on which is disposed a suitable packing 25 enclosed by a housing 26 which is secured to the head 23 by screws 27. On the inner side of the head 23 is additional packing 25' thereby to provide a satisfactory hydraulic seal at that end of the cylinder for a piston rod 28 which is reciprocable therein. At the lower end of the piston rod is a reduced extension 29 on which is mounted a piston 30 for limited sliding movement, thereby to afford limited lost motion between the piston rod and the piston. Suitable rubber-like packing 33' provides a seal between the periphery of the piston 30 and an inner cylinder 31 which is concentric with the cylinder 20 but spaced a slight distance therefrom to provide a longitudinally extending annular passage 32. Between the reduced piston extension 29 and the piston is a rubber-like packing 33 to provide a satisfactory liquid-tight seal therebetween.

Depending from the reduced piston extension 29 is a further reduced extension 34 and mounted thereon is a segmental frustum 35 of spring-like metal, the same being interposed between washers 36 and 37 on the extension 34. Suitably mounted on the periphery of the frustum 35 is a metallic shoe 38 which has a curvilinear extension adapted to contact with and ride along the inner surface of the cylinder 31 when the piston 30 moves upwardly therein. However, when the piston is forced downwardly by a liquid pressure on the top of it, a depending tubular extension 39 integral with the under side of the piston 30 bears against the frustum 35 near its outer edge portion and owing to the lost motion of the piston on the piston rod, the tubular extension 39 flexes the frustum away from the walls of the cylinder 31, thereby allowing the piston to move in that direction. When the pressure on top of the piston 30 is relieved, then the frustum bindingly engages the walls of the cylinder 31 and militates against downward movement of the piston. In this manner, the piston rod is retained in position of adjustment within the cylinder 31 so far as its inward or downward movement within the cylinder 31, is concerned.

The upper end of the cylinder 31 is apertured as indicated at 40 to enable liquid to flow between the inside of the cylinder 31 and the passage 32. The lower end of the passage 32 communicates by a passage 41 to one pressure side of the hydraulic pump 16. The other pressure side of the pump communicates through a passage 42 to the lower end of the cylinder 31.

In operation, upon energizing the electric motor 10, the hydraulic gear pump 16 is driven. By rotating the motor 10 in one direction, liquid is forced into the cylinder 31 through the passage 42 and liquid from above the piston 30 passes through the apertures 40 through the passage 32 to the lower pressure side of the pump through the passage 41. In this manner, the piston 30 is driven upwardly within the cylinder 31. When the motor 10 is deenergized, the piston 30 is restrained from inward movement by the engagement of the shoe 38 with the inner walls of the cylinder 31. Upon reversing the direction of rotation of the motor 10, liquid is forced from the high pressure side of the pump through the passage 41 and passage 32 through the apertures 40 and into the upper portion of the cylinder 31 to drive the piston 30 downwardly. Due to the lost motion afforded by the piston as above described, the shoe 38 is moved away from the walls of the cylinder to enable such motion. Liquid from beneath the piston 30 passes through the passage 42 to the low pressure side of the pump as will be readily understood.

From the above description, it will be apparent that I have produced a simple and efficient linear motor in which the piston can be hydraulically driven in either direction, depending upon the direction of rotation of the electric motor. It will be further understood that the cylinder and various passages above mentioned are nearly filled with liquid which is necessary to insure the proper operation of the linear motor. When the electric motor is deenergized, provision is made to hold or retain the piston in its position of adjustment against downward or inward movement. This is achieved by a mechanical device impinging against the inner walls of the cylinder.

It is to be understood that numerous changes in details of construction, arrangement and operation may be effected without departing from the spirit of the invention especially as defined in the appended claims.

What I claim is:

1. In a cylinder, piston rod, and piston assembly, means for restraining the piston against movement in only one of two opposite directions in said cylinder under influence of force applied through said piston rod while permitting movement of said piston and rod in either direction in response to the force of fluid applied to one side or the other of said piston, comprising: a cylinder having outer and inner ends; a piston rod having an inner end extending inwardly in said cylinder and movable inwardly and outwardly therein; a frusto-conical toggle spring having an apical portion affixed around the inner end of said rod and a skirt extending inwardly beyond the inner end of the rod; segmental shoes affixed on peripheral portions of said skirt, said shoes being normally spring-pressed outwardly by said spring to engage said cylinder, whereby to deter said rod against further inward movement; a piston comprising a single disc having a lower side disposed towards the inner end of the rod and towards the spring and having an upper side disposed towards the outer end of the cylinder, said disc having an outer periphery slidably engaging within the cylinder and an inner periphery slidably engaging around the rod and being slidable axially on the rod between two positions respectively adjacent and remote from the spring, and projections on the lower side of said disc adapted to engage the skirt upon sliding of said disc towards the skirt, whereby to cam said shoes inwardly in response to fluid pressure on the upper side of said piston.

2. The combination claimed in claim 1, and a fluid seal on said disc slidably engaging the piston rod.

References Cited in the file of this patent

UNITED STATES PATENTS

| Number | Name | Date |
|---|---|---|
| 1,353,244 | Joerns | Sept. 21, 1920 |
| 1,614,790 | Halstead et al. | Jan. 18, 1927 |
| 2,323,731 | Shetzline | July 6, 1943 |
| 2,338,069 | Horton et al. | Dec. 28, 1943 |
| 2,352,390 | Kirkland | June 27, 1944 |
| 2,467,508 | Trautman | Apr. 19, 1949 |
| 2,473,694 | Renick | June 21, 1949 |

FOREIGN PATENTS

| Number | Country | Date |
|---|---|---|
| 669,102 | Germany | Dec. 16, 1938 |